June 10, 1952 L. OBERT ET AL 2,599,578
DEVICE FOR MEASURING THE CHANGE OF STRAIN IN A SOLID MEDIUM
Filed Nov. 17, 1950 2 SHEETS—SHEET 1

LEONARD OBERT and
WILBUR I. DUVALL
INVENTORS

BY H. L. Godfrey
ATTORNEY

June 10, 1952 L. OBERT ET AL 2,599,578
DEVICE FOR MEASURING THE CHANGE OF STRAIN IN A SOLID MEDIUM
Filed Nov. 17, 1950 2 SHEETS—SHEET 2
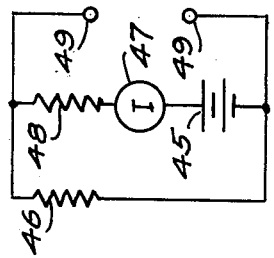
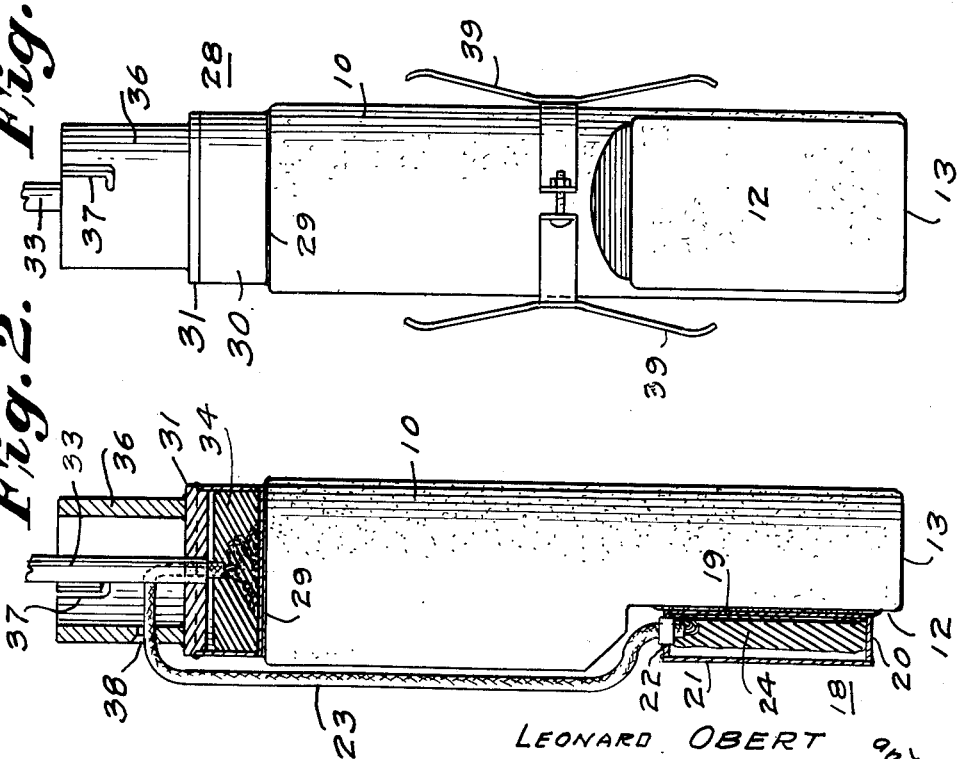
LEONARD OBERT and
WILBUR I. DUVALL
INVENTORS
BY H. L. Godfrey
ATTORNEY Patented June 10, 1952

2,599,578

UNITED STATES PATENT OFFICE 2,599,578

DEVICE FOR MEASURING THE CHANGE OF STRAIN IN A SOLID MEDIUM

Leonard Obert, Silver Spring, and Wilbur I. Duvall, Greenbelt, Md.

Application November 17, 1950, Serial No. 196,334

1 Claim. (Cl. 73—88.5)

(Granted under the act of March 3, 1883, as amended April 30, 1928; 370 O. G. 757)

The invention described herein may be manufactured and used by or for the Government of the United States for governmental purposes without payment to us of any royalty thereon in accordance with the provisions of the Act of April 30, 1928 (ch. 460, 45 Stat. L. 467).

This invention relates to means for and methods of measuring strain within solid mediums, and more particularly to means for and methods of measuring dynamic linear and volumetric strain within a solid medium.

Strain, as used herein, is the change in a dimension per unit of that dimension. Linear strain is change in length per unit length. Volumetric strain is change in volume per unit volume, or dilatation.

No means for or method of measuring linear strain within a solid medium or body of rock was known to the art prior to the invention described herein. No satisfactory means for or method of measuring a pure compressional wave in a solid medium has heretofore been known. Further, no means for or method of measuring dilatation within a solid medium has heretofore been known. The term "solid medium," as used herein, includes substances ranging from semi-plastics to perfectly elastic solids.

An object of this invention is to provide a means for and method of measuring linear and volumetric strain within a body of solid medium.

Another object of this invention is to provide a means for and method of measuring an irrotational or compressional wave within a solid medium without responding to the solenoidal or shear wave present at the same time within the medium.

A further object of this invention is to provide a device which responds to wide ranges of linear and volumetric strain and to a wide frequency range of dynamic strain, as from 0 to 10,000 C. P. S. or greater.

A still further object of this invention is to provide a strain measuring device and method having and utilizing a low internal electrical impedance.

Other objects will appear more fully from the following description taken in connection with the accompanying drawing, wherein:

Figure 2 is a longitudinal sectional view of the core assembly of a dilatation gauge core assembly when completely assembled.

Figure 3 is an elevational view of an embodiment of the core assembly of a gauge adapted for measurement of linear strain only.

Figure 4 is a vertical sectional view, partly in elevation, of a core assembly mounted in a solid medium in accordance with the invention.

Figure 5 is a wiring diagram of a circuit constituting one part of the invention.

Figure 1:
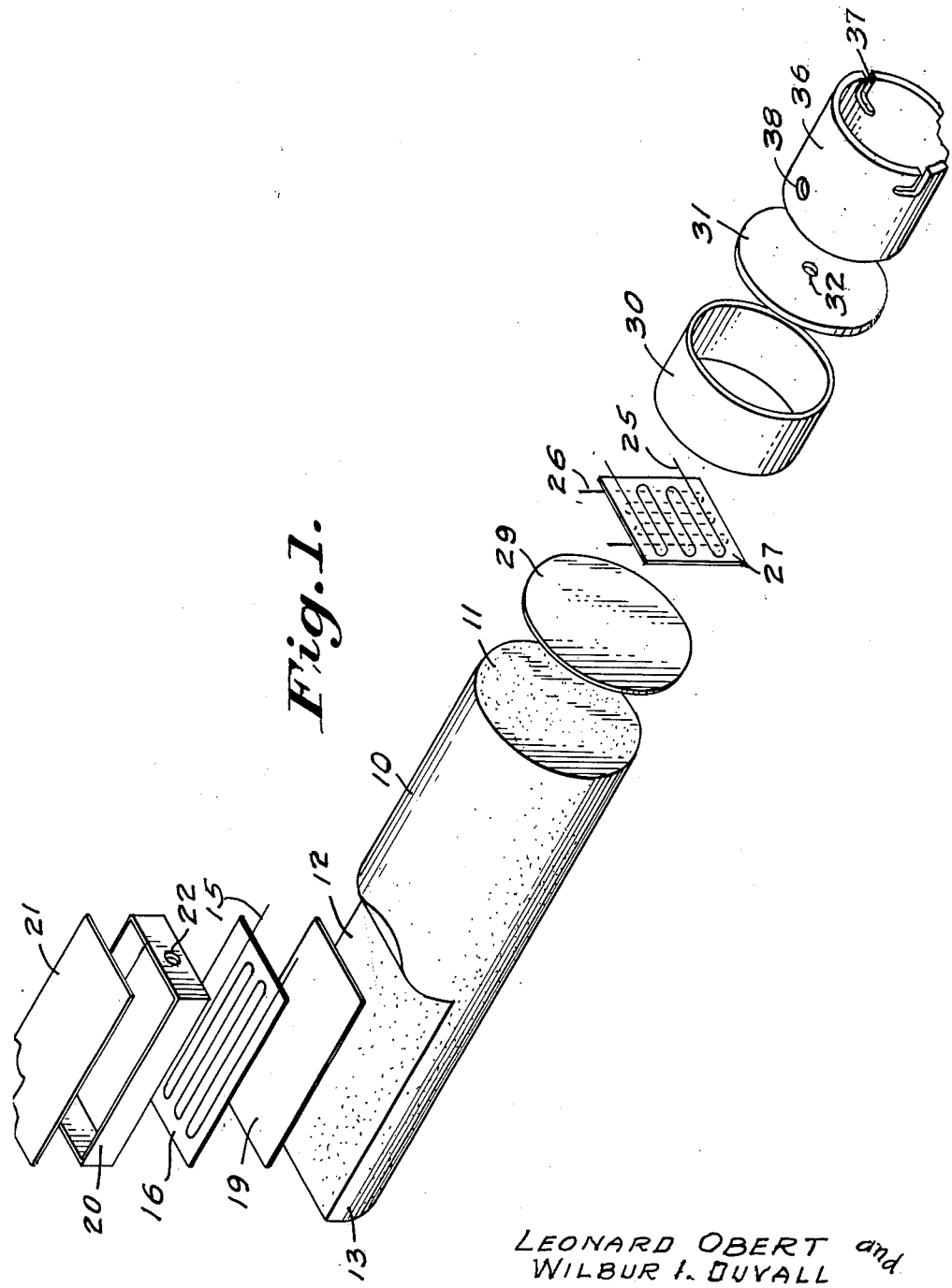
Figure 1 is an exploded view of the core assembly of a dilatation gauge.

In the preferred embodiment of the invention illustrated in the drawings, a core 10 is obtained from the solid medium in which measurements are to be made or from a solid medium having similar physical properties. The core 10 may comprise a 2⅛ inch diameter cylindrical diamond-drill core approximately seven inches long, with one end 11 thereof perpendicular to the axis of the cylinder. A flattened surface 12 extends nearly half the length of the core 10 from an opposite end 13. The surface 12 is parallel to the axis of the core 10.

In accordance with the invention, means responsive to linear strain along the axis of the cylinder are provided. Such means may take the form of an electric resistance strain gauge element, hereinafter referred to as a strain element 15. This element may conveniently comprise a fine wire grid in which lengths of wire are connected electrically in series but arranged geometrically in parallel along the strain responsive axis of the element. The wire grid is mounted on a piece of paper 16 and secured to the flattened surface 12 with its axis parallel to the core cylinder axis.

Suitable means for waterproofing and electrostatically shielding the strain element 15 are provided. Such shielding and waterproofing means may take the form of an enclosed shielding box 18 which is made up of a thin copper foil bottom 19, an open ended copper box 20, and a copper top or cap 21. Shielding box 18 is provided with a hole 22 to admit a two-wire waterproofed and shielded lead 23 which is connected to the strain element 15 and extends along the body of the core 10 toward the end 11 thereof. Shielding box 18 may be filled with wax 24 to protect further the strain element 15 from moisture.

A second strain element 25 and a third strain element 26, both similar to the wire grid of strain element 15, are mounted on one piece of mounting paper 27. They are arranged to be responsive to strain in mutually perpendicular directions and in a plane perpendicular to the axis of the core 10.

Waterproofing and electrostatic shielding means are preferably provided for the second and third strain elements 25 and 26. This may conveniently take the form of a shielding cup 28 comprising a copper foil disc 29 as a base, an open ended copper cylinder 30, and a copper top or cap 31.

A hole 32 is provided in the top 30 to admit a shielded lead 33.

The shielding cup 28 is filled with wax 34 as further means for excluding moisture from the strain elements 25 and 26, and is mounted on the first end 11 of core 10.

To facilitate easy handling of the core assembly, a positioning cylinder 36 is secured to the top 31. The positioning cylinder 36 has two slots 37 cut in it to receive a tool for positioning the core assembly, and also a hole 38 to permit passage of the shielded and waterproofed lead 23.

The shielded lead 33 is a 6-wire shielded and waterproofed cable. Four of the wires pass through the hole 32 in the top 31 and are soldered to strain elements 25 and 26. The other two wires are connected to the shielded and waterproofed cable 23 which passes through the hole 38 in the positioning cylinder 36 and along the body of the core 10 and makes connection with the strain element 15.

It is possible to assemble the shielded and waterproofed strain elements on surfaces directly within the medium. But the difficulties in making secure bonds of the parts have suggested the embodiment described as a preferred one.

Satisfactory results in assembling the parts may be obtained by the following procedure:

First, the surfaces 11 and 12 are lapped to insure flatness and the core is oven dried. The core surfaces 11 and 12 and the copper foil 19 and 29 are generously coated with a cement which is a combination of volatile and thermal setting components. Volatile components of the cement may be removed by heating the pieces separately. The cemented surfaces are then clamped together under a pressure and heated sufficiently to set the thermal components in the adhesive.

The strain element 15 is cemented to the shielding foil 19 and the strain elements 25 and 26 are cemented to the shielding foil 29 in accordance with the procedure recommended by the manufacturer of the strain element used. After a proper drying period the strain elements are covered with wax 24 and 34 to exclude moisture as illustrated in Figure 2. The bix walls 20 of as illustrated in Figure 2. The box walls 20 of the shield cup 28 are soldered in place and the tops thereto, 21 and 31, soldered to the walls 20 and 30. The positioning cylinder 36 is soldered to the shield cup top 31. The orientation of the slots 37 relative to the axis of the strain elements 25 and 26 is noted. All soldered joints and cable holes are coated with a waterproofing compound to further assure no leakage of moisture.

To complete the core assembly, a wire spider 39 (Fig. 3) is clamped at the center of the core to provide a means for positioning the core assembly.

A hole 40, free of moisture or foreign matter, is provided in the medium in which the measurements are to be made to receive the core assembly. The assembly is lowered into the hole 40 by means of an inverted T-shaped tool constructed to catch in the slots 37 of the positioning cylinder 36 and to be releasable therefrom. The core assembly is cemented in place as illustrated in Figure 4. A cement 41 is preferably used which has an acoustical impedance substantially the same as that of the solid medium. Strong gypsum cements have been found satisfactory for such purpose. The cement should cover the gauge several inches and completely fill the void between the hole and the core assembly.

Core assemblies having only one or two strain elements may be desirable for certain applications of the invention. For instrumenting a given problem the choice of the number of elements depends on what strain components are to be measured. Figure 3 illustrates a core assembly which includes only one strain element. This element is mounted in the shield cup 28 at the end of the core 10.

Suitable means responsive to the strain in the strain elements 15, 25, and 26 and for determining such strain, are provided. The determination of strain may be accomplished by measuring the change in resistance of the strain elements since change in resistance of the elements is proportional to the change in strain thereof. One means for this determination, which is responsive to strain in the strain elements, may comprise the circuit illustrated in Figure 5. This circuit generates an electric output that varies as the strain of the strain elements. A voltage from a source of D. C. voltage 45 is applied across a gauge element 46. The gauge element 46, represented as a resistor in Figure 5, comprises a series connection of one or more of the strain elements 15, 25, and 26, depending upon whether linear strain or dilatation measurements are to be made.

The current through the gauge element 46, which results from the voltage 45, is measured by an ammeter 47 connected in series with and adjacent to the voltage source 45. A resistor 48 is shown in Figure 5 to represent the total input resistance of the circuit, including the resistance of the wiring, the voltage source 45, and the ammeter 47.

Connections adapting the circuit for measurements of changes in the voltage drop across the gauge element 46, are provided. This is illustrated in Figure 5 as the wiring from the ends of the resistor 46 to two terminals 49, which are the electrical output terminals of the gauge. Easy observation and recordation of the electrical output may be effected by use of suitable amplifiers and photographically recording oscilloscopes adapted to be responsive to the gauge output.

In the operation of the device to measure dilatation in accordance with the invention, a core assembly is properly cemented within the solid medium and the strain elements are connected in series to the circuit shown in Figure 5 in the manner previously indicated. Dynamic strains are produced within the solid medium. The wires of strain elements 15, 25, and 26 in a properly located core assembly, are successively lengthened and shortened by the strains in the medium, and corresponding increases and decreases in resistance result. The voltage drop across the individual strain elements 15, 25 and 26 varies in proportion to the linear strain of the respective elements.

Where R is the resistance of gauge element 46, $r$ is the total input resistance 48, I is the current through R, $\Delta e$ is the change in strain in the wires composing R, $f$ is the gauge factor, that is, change in resistance per unit resistance, per change in length per unit length of the strain element wire, and $\Delta E$ is the change in the voltage across R or gauge output, the following formula may be written.

$$\Delta E = \frac{(Rr)}{(R+r)} f I \Delta e$$

Where R is only one strain element, instead of a series connection of three elements, then $\Delta E$ is a measure of the linear strain in the particular plane and direction of the strain element concerned.

In general, disturbances in solid mediums give rise to both shear waves and compressional waves. Because a linear strain element responds to both waves, it has therefore been exceedingly difficult, and in some cases impossible, to measure the compressional wave independently of the shear wave. It has been discovered, however, that linear strains in three mutually perpendicular directions resulting from shear waves add up vectorially to zero. It follows that shear waves produce no dilatation. Compressional waves, on the other hand, do produce dilatation.

In one embodiment of the invention, therefore, three strain elements, mounted to be responsive to strain in three mutually perpendicular directions, are connected electrically in series. The shear wave components in each individual strain element cancel each other out, and the total output of the gauge is responsive only to the compressional wave. A measurement of the compressional wave alone and of dilatation is the result.

It is understood that modifications may be made in the device as herein described without departure from the spirit and scope of the invention as set forth in the appended claim.

We claim:

In a device for measuring strain in a solid medium, a core of physical properties similar to those of the solid medium, said core having two mutually perpendicular surfaces, an electrostatically shielded strain element firmly secured to the first of said surfaces and being so positioned as to be responsive to strain in a direction perpendicular to the plane of the second of the said surfaces, two strain elements positioned to be responsive to strains in the same plane but in mutually perpendicular directions firmly secured to the second of said surfaces and enclosed in an electrostatic shield, means responsive to strain in said elements.

LEONARD OBERT.
WILBUR I. DUVALL.

REFERENCES CITED

The following references are of record in the file of this patent:

UNITED STATES PATENTS

| Number | Name | Date |
|---|---|---|
| 1,708,333 | Smith | Apr. 9, 1929 |
| 2,036,458 | Carlson | Apr. 7, 1936 |
| 2,318,102 | Ruge | May 4, 1943 |
| 2,322,319 | Ruge | June 22, 1943 |
| 2,363,181 | Howland | Nov. 21, 1944 |
| 2,392,293 | Ruge | Jan. 1, 1946 |
| 2,438,589 | Walker | Mar. 30, 1948 |